United States Patent [19]
Daniels et al.

[11] 3,988,821
[45] Nov. 2, 1976

[54] ASSEMBLY STAND FOR ASSEMBLING CRANK SHAFTS

[76] Inventors: George D. Daniels, 142 Wilson Way, Pioneer Park, Milpitas, Calif. 95035; Arnold T. Malley, 38660 Lexington St., Fremont, Calif. 94536

[22] Filed: Mar. 24, 1975

[21] Appl. No.: 561,489

[52] U.S. Cl. .................................. 29/283; 29/200 P
[51] Int. Cl.² .................... B23Q 71/04; B23P 19/04
[58] Field of Search ............... 29/200 J, 200 P, 252, 29/282, 283, 6, 255; 269/287, 307, 156; 248/44; 211/49 R; 279/1 L, 1 J

[56] References Cited
UNITED STATES PATENTS

| | | | |
|---|---|---|---|
| 1,645,669 | 10/1927 | Stevenson | 29/200 J |
| 1,889,986 | 12/1932 | Haywood | 269/156 X |
| 2,896,958 | 7/1959 | Strauss | 269/156 X |
| 3,276,830 | 10/1966 | Vorndran | 211/49 D |
| 3,789,894 | 2/1974 | Adams | 269/156 X |
| 3,845,962 | 11/1974 | Molin | 279/1 J |

*Primary Examiner*—Al Lawrence Smith
*Assistant Examiner*—Nicholas P. Godici
*Attorney, Agent, or Firm*—Julian Caplan

[57] ABSTRACT

Crankshafts for motorcycles and certain other engines or assemblies of one or more gears, bearings to mount in the crankcase, bearings for rods, fly wheel cheeks, bearing seals and the like which interfit by means of stub shafts in one element fitting into holes in another element and some of the stub shafts are eccentric relative to the others. For repair, it is necessary to separate the elements and for such purpose a stand is provided having a base to fit on a press bed, a column of appropriate height for the length of the shaft handled and a shelf at the top of the column formed with a slot. The uppermost element is placed above the shelf and the others hang below. The press ram forces the projecting staff stub down while the uppermost element is held stationary, causing separation thereof from the remaining elements and this procedure is repeated until all elements are disassembled. For reassembly, a second stand is provided having an apertured base and three radially adjustable column elements. The shaft is assembled by placing the base on a press bed, inserting the stub of the lowermost shaft element on the top of the base with its stub extending through the aperture and the next element on top of the lowermost. The press ram forces these two elements into engagement and the procedure repeated until the entire shaft is assembled. The column elements are intially adjusted to provide lateral support to hold the shaft elements aligned and keep the fly wheel cheeks level.

6 Claims, 7 Drawing Figures

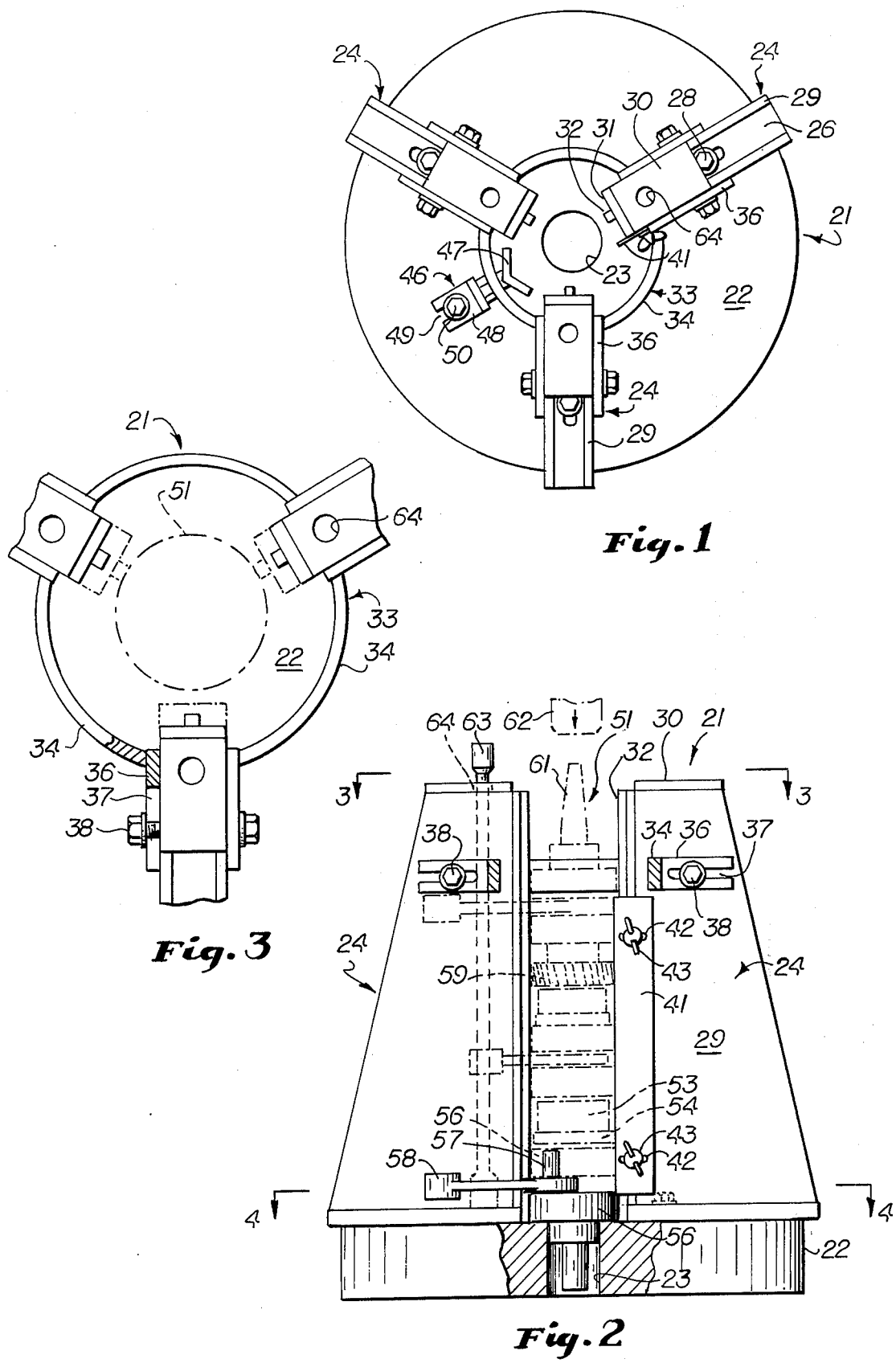

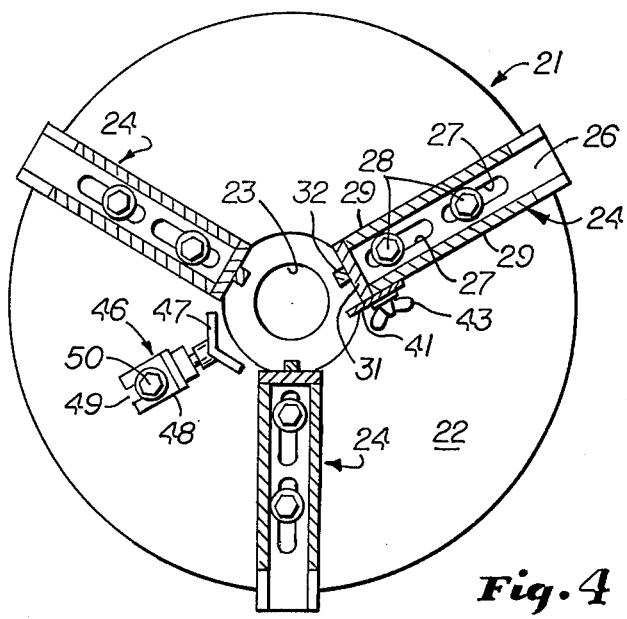
Fig. 4
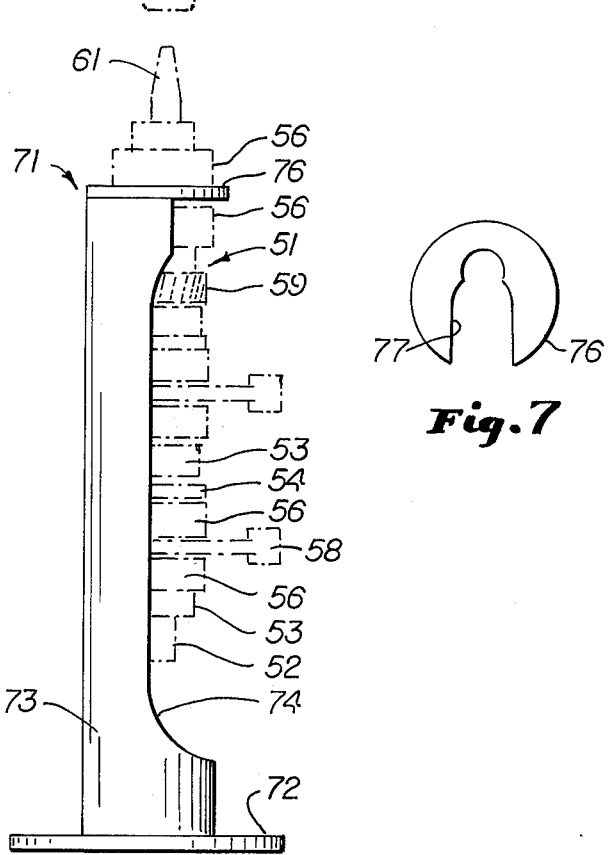
Fig. 5
Fig. 7
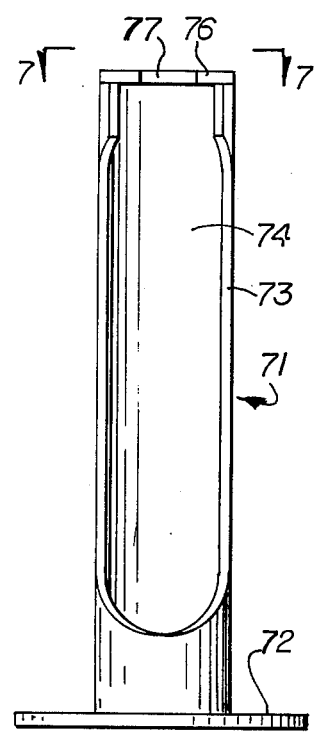
Fig. 6

ASSEMBLY STAND FOR ASSEMBLING CRANK SHAFTS

This invention relates to a new and improved system for assembling and disassembling crank shafts particularly the types of crank shafts used in motorcycles comprising multiple interfitting elements having projecting stub shafts which are pressed into bores in the adjacent elements.

More particularly, the invention relates to a system comprising an assembly stand and a disassembling stand. The assembly stand is constructed to position the bearings, bearing seals, fly wheel cheeks, gears and rods of a crank shaft and space them apart and align them to fit the crank case and especially in such manner that the pins in the crankcase fit into holes in the bearings of the crank shaft assembly in proper relationship. Heretofore, assembly has been a difficult and time consuming operation. The present invention provides a stand for assembly which permits rapid and accurate assembly of the elements by mechanics having no special training or skills in use of the stand.

In addition to the assembly stand, a disassembly stand is provided which facilitates rapid disassembly of the elements.

A feature of the construction of the two stands is that they fit a variety of different sizes and makes of crank shafts. The assembly stand is provided with adjustable elements depending upon the diameter of the shaft.

Another feature of the invention is the fact that both stands are provided with bases which fit upon the bed of a conventional hydraulic press of the type used in machine shops. The ram of the press is used for disassembly and assembly.

Another feature of the invention is the provision of a scriber blade mounted on the assembly stand in such a manner that a scriber may be drawn along the edge of the blade to mark the assembled elements so that when they are inserted in the crankcase they are properly aligned.

Other objects of the present invention will become apparent upon reading the following specification and referring to the accompanying drawings in which similar characters of reference represent corresponding parts in each of the several views.

In the drawings:

FIG. 1 is a top plan view of an assembly stand in accordance with the present invention.

FIG. 2 is a side elevational view thereof partly broken away to reveal internal construction.

FIGS. 3 and 4 are respectively schematic horizontal sectional views taken substantially along the lines 3—3 and 4—4 respectively of FIG. 2.

FIG. 5 is a side elevational view of a disassembly stand in accordance with the present invention.

FIG. 6 is an end elevation viewed from the right in FIG. 5.

FIG. 7 is a fragmentary top plan as viewed along line 7—7 of FIG. 6.

Assembly stand 21 is used to assemble the various elements. Such a stand has a base 22 shaped to fit on the bed of a press (not shown) and preferably such base 22 is heavy and thick and may comprise a casting. A central hole 23 is provided. Mounted extending vertically above base 22 is a plurality of column elements 24 preferably three in number.

Each element 24 comprises a base 26 which fits on top of base 22 formed with slots 27 to receive bolts 28 which are threaded into holes (not shown) in base 22. The elements 24 may be moved radially inwardly and outwardly to accommodate different diameter crank shafts, said inward and outward movement being accommodated by the length of slots 26. Extending up from base 26 are spaced sides 29 joined and braced together by means of a top 30. The inner face of each element 24 is provided with a front 31 facing inward and at the center of front 31 is a vertically extending front alignment guide 32 which engages various crank shaft elements in the assembly operation as hereinafter described and holds them in alignment. Preferably the elements 24 are accurately positioned equi-distant from holes 23 so that the crank shaft elements are symmetric about hole 23.

In order to prevent the elements 24 from spreading apart out of alignment under stress, connecting arms 33 are provided interconnecting and bracing adjacent elements 24. Such arms 33 have an arcuate portion 34 which bridges the space between elements 24 and each end of arcuate portion 34 terminates in an ear 36 which is located horizontally and parallel to the adjacent sides 29. Each ear 36 is formed with a horizontal slot 37 to receive a bolt 38 which is threaded into side 29. Thus the connecting arms 33 rigidify the parallel relationship of the elements 24.

On one of the elements 24 a scriber plate 41 is mounted, said plate extending vertically toward the hole 23. The plate 41 is radially adjustable and for such purpose is provided with horizontal slots 42 which receive bolts 43 threaded into one side 29.

Further, to facilitate assembly, a gauge 46 may be provided on one base 22 midway between two adjacent elements 24 (see FIGS. 1 and 4). Such gauge 46 has an inner end 47 here shown as an obtuse angle bar to which is connected a radial arm 48 provided with a radial slot 49 to receive a bolt 50 threaded into a hole in base 22 so that the gauge 46 may be moved inward and outward for accurate positioning of the eccentric lowermost element of the crank shaft 51 hereinafter described. Preferably, the gauge 46 is opposite the scriber plate 41.

The crank shaft 51 illustrated in FIG. 2 is schematic, and it will be understood that the present device accommodates wide variations in diameter, total height and makeup of components. Nevertheless, a large size long crank shaft 51 best illustrates the versatility of the invention. Such a shaft 51 has a lower stub shaft 52 extending through hole 23. A series of bearings 53 and bearing seals 54 adjacent thereto is spaced along the length of shaft 51. Further, fly wheel cheeks 56 are spaced apart in parallel relation; and as best shown in FIG. 2, one said cheek 56 may have a rod pin 57 which fits into the opposite cheek 56, it being noted that the pin 57 is parallel but eccentric to stub 52. Lowermost cheek 56 is larger than hole 23 and thus rests on base 22. Connecting rod 58 fits between cheeks 56 and receives pin 57. Also mounted on crank shaft 51 is a gear 59. The number of cylinders and the different crankcase designs determine the diameter of the various elements making the shaft, their positions and spacings. At the upper end of the shaft 51 is an upper stub shaft 61 which is usually concentric with shaft 52.

At the outset, the various elements 24 are positioned on base 22 by sliding the same inwardly and outwardly prior to tightening of bolts 28. When the proper spacing is obtained, tool 63 fitting through hole 64 in top 30 or some other means is employed to tighten the bolts 28. Thereupon, the arms 33 are installed and bolts 38 tightened. At this time, the scriber 41 is either removed or is drawn radially outwardly so that it does not conflict with installation of the various crank shaft elements. With the base 22 mounted on the bed of a press (not shown) lower stub shaft 52 is installed through the hole 23 and the first elements 53, 54 56 are then installed on the shaft 52 using the ram 62 of a conventional hydraulic press to force the various parts into alignment. The various elements shown in FIG. 2 are then filled up sequentially until upper stub shaft 61 is installed.

Thereupon, the scriber 41 is brought up against the surfaces of the bearings and fly wheel cheeks and a scriber (not shown) is drawn along the side of blade 41 to make a mark which shows the alignment of the parts. It will be understood that heavy bearings 53 customarily have radial holes at certain locations therein to receive pins extending from the crankcase (not shown) and proper alignment is very important in order that these pins will fit properly. Further, the spacing of the various elements along the length of shaft 51 is likewise critical and the parallel relation of the parts likewise is important. The front alignment guides 32 insure that the parts are properly centered, and are in proper relation.

Directing attention to FIGS. 5-7, a disassembly stand 71 is provided to separate the parts of crankcase 51. Stand 71 has a base 72 which fits on to the bed of the same press used for assembly. Extending vertically up from base 72 is a column 73 here shown as a piece of tubing with a cutout portion 74 extending from a point near the bottom and up to the top. A top shelf 76 extends parallel to base 72 and is formed with a hole 77 through most of its extent.

In use of the stand 71, a crank shaft, 51 which is here shown for illustration purposes as being substantially the same as that of FIG. 2, is installed with the upper stub shaft 61 uppermost. The first element 56 to be removed is positioned on top of shelf 76 and the gap between adjacent cheeks 56 accommodates shelf 73. Thereupon, ram 62 is brought against the upper end of shafts 61 causing the upper cheek 56 to be pulled away from the next cheek 56, or in other words, the pin 57 is pulled out of the lower two cheeks 56. The same procedure is repeated until the entire shaft 51 is disassembled. Thereupon, repairs and replacements are performed. After repair, the parts are reassembled using the stand of FIGS. 1-4.

We claim:

1. An assembly stand for assembling multiple crank shaft elements for use on a press comprising a first base shaped to fit on a conventional press bed, said first base formed with a central aperture, at least three column elements each movable radially inward and outward of said central aperture, each said column element having a second base slidable along said first base, cooperating means to secure said second base fixed to said first base in a desired position of adjustment, and a vertically elongated front facing said central aperture, said front having an inward projecting, vertically elongated front alignment guide, said front alignment guide comprising a narrow, thin strip extending vertically from top to bottom on the inward facing surface of said front, said strips being located closest to said central aperture of all portions of said column elements, the space between said column elements being unobstructed at the top for application of force by the ram of said press.

2. A stand according to claim 1 in which each said element has at least one vertically elongated side parallel to a radius of said first base.

3. A stand according to claim 2 which further comprises connecting arms joining sides of adjacent elements to prevent said elements from being forced out of parallel alignment and adjustable means for connected opposite ends of said arms to said sides.

4. A stand according to claim 1 which further comprises a scriber plate having an elongated vertical scribing edge and means to secure said plate to one of said elements in adjustable positions relative to said central aperture.

5. A stand according to claim 1 in which each said column element has a pair of vertical sides extending parallel to a radius from opposite vertical edges of said front and a top bridging said sides.

6. A stand according to claim 1 which further comprises a gauge adjustably positioned on said first base, said gauge having an inner end formed as an angle in top plan for positioning tangent to a fly wheel element positioned on said first base, a radial arm projecting outward of said inner end and second cooperating means to secure said arm to said first base in a desired position of adjustment.

* * * * *